United States Patent [19]

Kamaike

[11] 4,052,651
[45] Oct. 4, 1977

[54] ELEVATOR SPEED CONTROL SYSTEM
[75] Inventor: Hiroshi Kamaike, Inazawa, Japan
[73] Assignee: Mitsubishi Denki Kabushiki Kaisha, Tokyo, Japan
[21] Appl. No.: 645,295
[22] Filed: Dec. 29, 1975
[30] Foreign Application Priority Data
  Dec. 27, 1974   Japan .................................. 49-3901
[51] Int. Cl.² ............................................. B66B 1/30
[52] U.S. Cl. .................................. 318/230; 318/227; 187/29 R
[58] Field of Search ............. 187/29 R; 318/230, 227, 318/212, 211, 203 R

[56]       References Cited
       U.S. PATENT DOCUMENTS 3,866,097   2/1975   Anzai et al. ........................... 318/230
3,948,357   4/1976   Maynard et al. .................. 187/29 R
3,973,175   8/1976   Anzai et al. .......................... 318/230

Primary Examiner—Herman J. Hohauser
Attorney, Agent, or Firm—Wenderoth, Lind & Ponack

[57]            ABSTRACT

In an elevator speed control system, the actual speed signal from an induction motor is subtracted from a command speed signal and then supplied to a nonlinear circuit. The circuit produces an output voltage approximately proportional to the square root of its input voltage. The output voltage is applied to three phase shifters, one for each phase of a three-phase system, to produce firing signals to control the conduction of associated thyristors resulting in the control of a three-phase voltage applied to the motor and therefore its rotational speed.

5 Claims, 8 Drawing Figures

FIG. 6

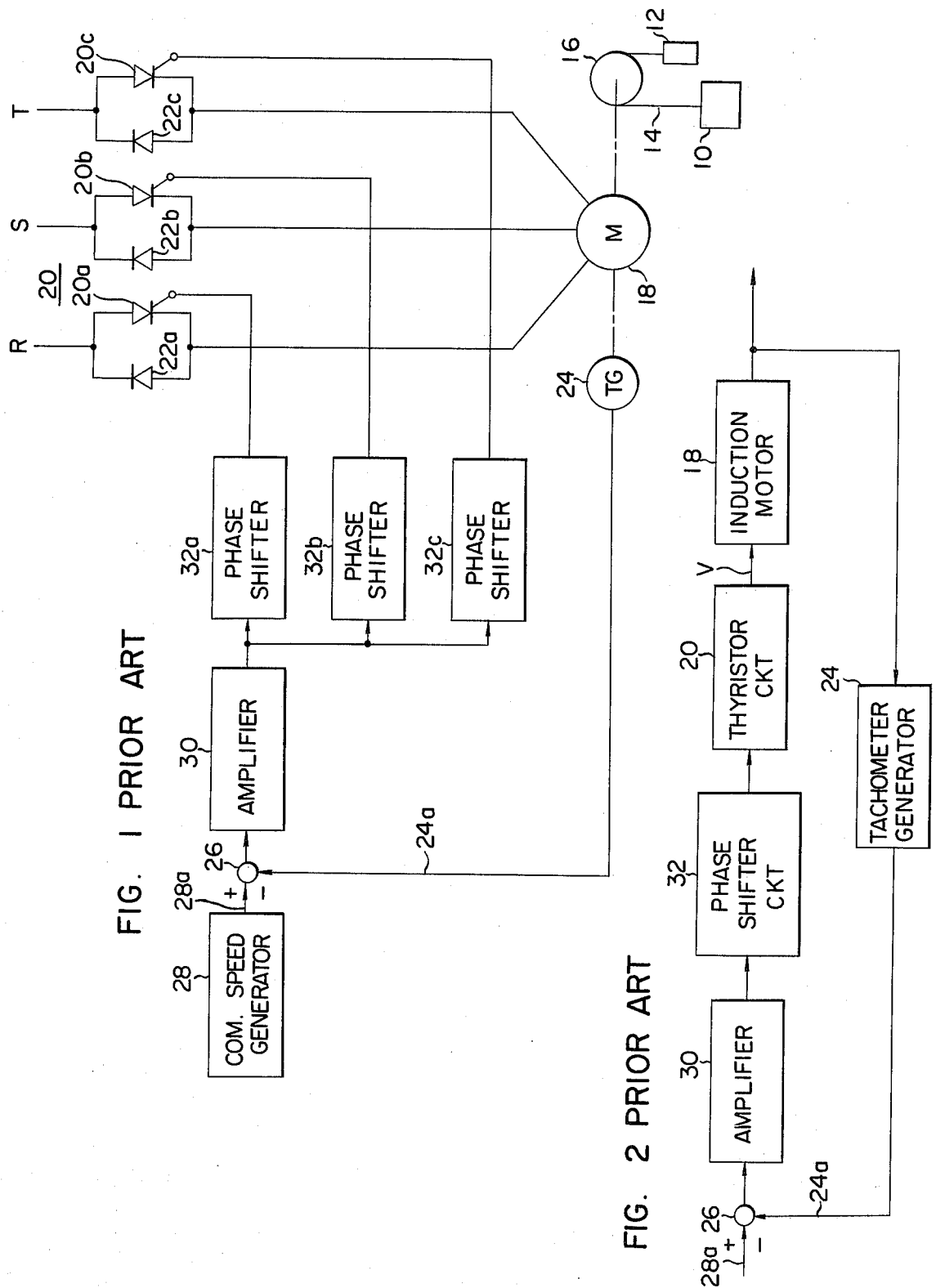

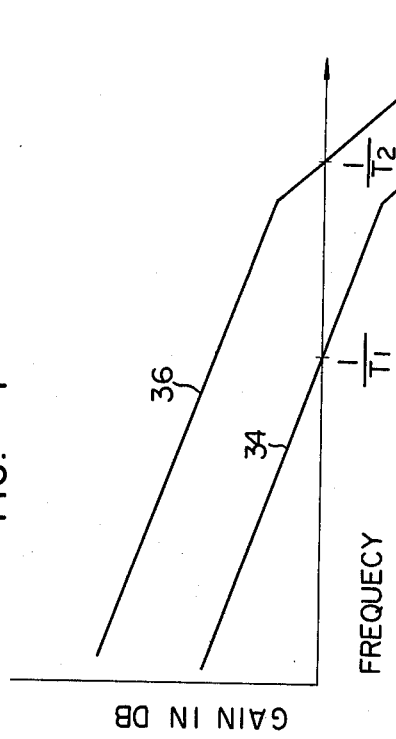
FIG. 3
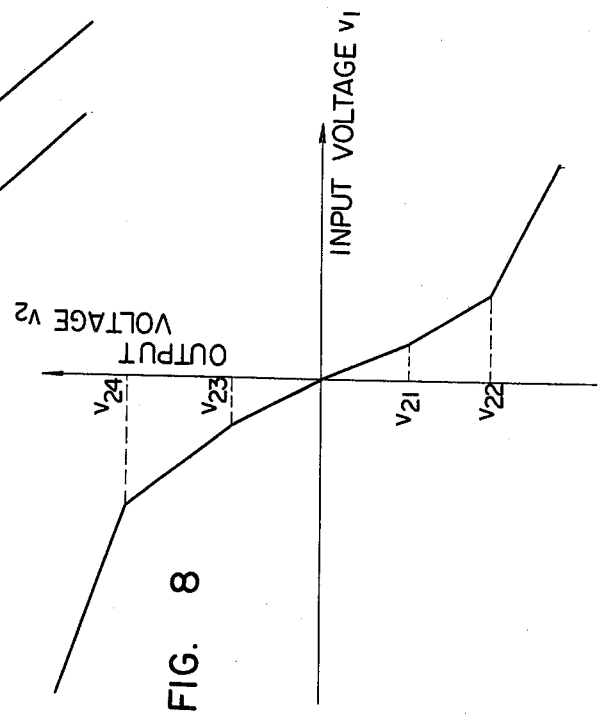
FIG. 4
FIG. 8
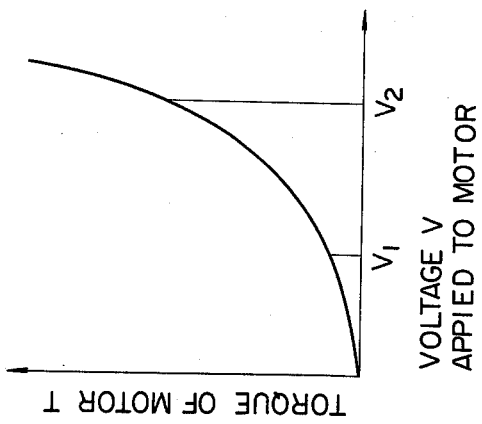
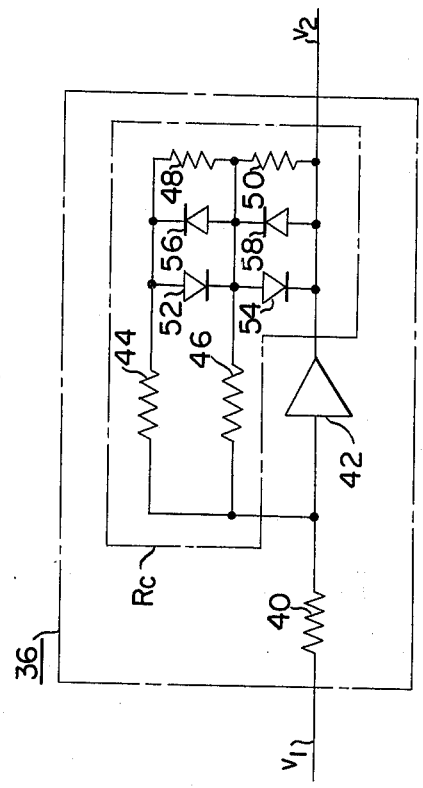
FIG. 7

ELEVATOR SPEED CONTROL SYSTEM

BACKGROUND OF THE INVENTION

This invention relates to improvements in an elevator speed control system for controlling the rotational speed of an induction motor in response to a command speed signal.

With the advance of the semiconductor technology, there have been recently utilized control systems for controlling the rotational speed of an induction motor by changing the voltage applied to the motor by a thyristor or thyristors. When applied, for example, to elevator systems, the conventional type of those control systems can have an overall transfer characteristic selected to be most suitable only for a given voltage applied to the induction motor. Under these circumstances, any voltage exceeding the given voltage causes an extraordinarily rapid response of the system and therefore unstable operation resulting in the movement of an associated elevator car becoming very vibrational. On the contrary, any voltage below the given voltage causes the systems to be extraordinarily slow in response. As a result, the elevator car tends to overshoot its position where it is to land. Alternatively it has been likely to be affected by various external disturbances.

Accordingly it is an object of the present invention to eliminate the disadvantages of the prior art practice as above described.

It is another object of the present invention to provide a new and improved elevator speed control system for stably controlling the rotational speed of an inductor motor for an elevator car with a high accuracy by always maintaining the overall gain thereof constant even though the induction motor produces a torque which changes in response to a variation in the voltage applied thereto.

SUMMARY OF THE INVENTION

The present invention provides an elevator speed control system for controlling the rotational speed of an induction motor, comprising an induction motor, a thyristor circuit for controlling the voltage applied to the induction motor, a command speed signal generator for generating a command speed signal for the rotational speed of the inductor motor, a tachometer generator connected to the induction motor to generate a speed signal representing the actual rotational speed of the induction motor, a subtracter connected to both the command speed signal generator and the tachometer generator to produce a difference signal between output signals from the two generators, phase shifter means responsive to said difference signal from the amplifier to produce firing signals for said thyristor circuit, the induction motor, the tachometer generator, the subtracter, the phase shifter means and the thyristor circuit forming a closed loop circuit, and a nonlinear circuit disposed in the closed loop circuit to produce an output voltage approximately proportional to the square root of the input voltage applied thereto.

BRIEF DESCRIPTION OF THE DRAWINGS

The present invention will become more readily apparent from the following detailed description taken in conjunction with the accompanying drawings in which:

FIG. 1 is a combined block and circuit diagram of an elevator speed control system for an induction motor constructed in accordance with the principles of the prior art;

FIG. 2 is a block diagram of the arrangement shown in FIG. 1;

FIG. 3 is a graph illustrating the applied voltage-to-torque characteristic of an induction motor;

FIG. 4 is a graph illustrating a Bode diagram for the arrangement shown in FIG. 2;

Figures 5, 6:
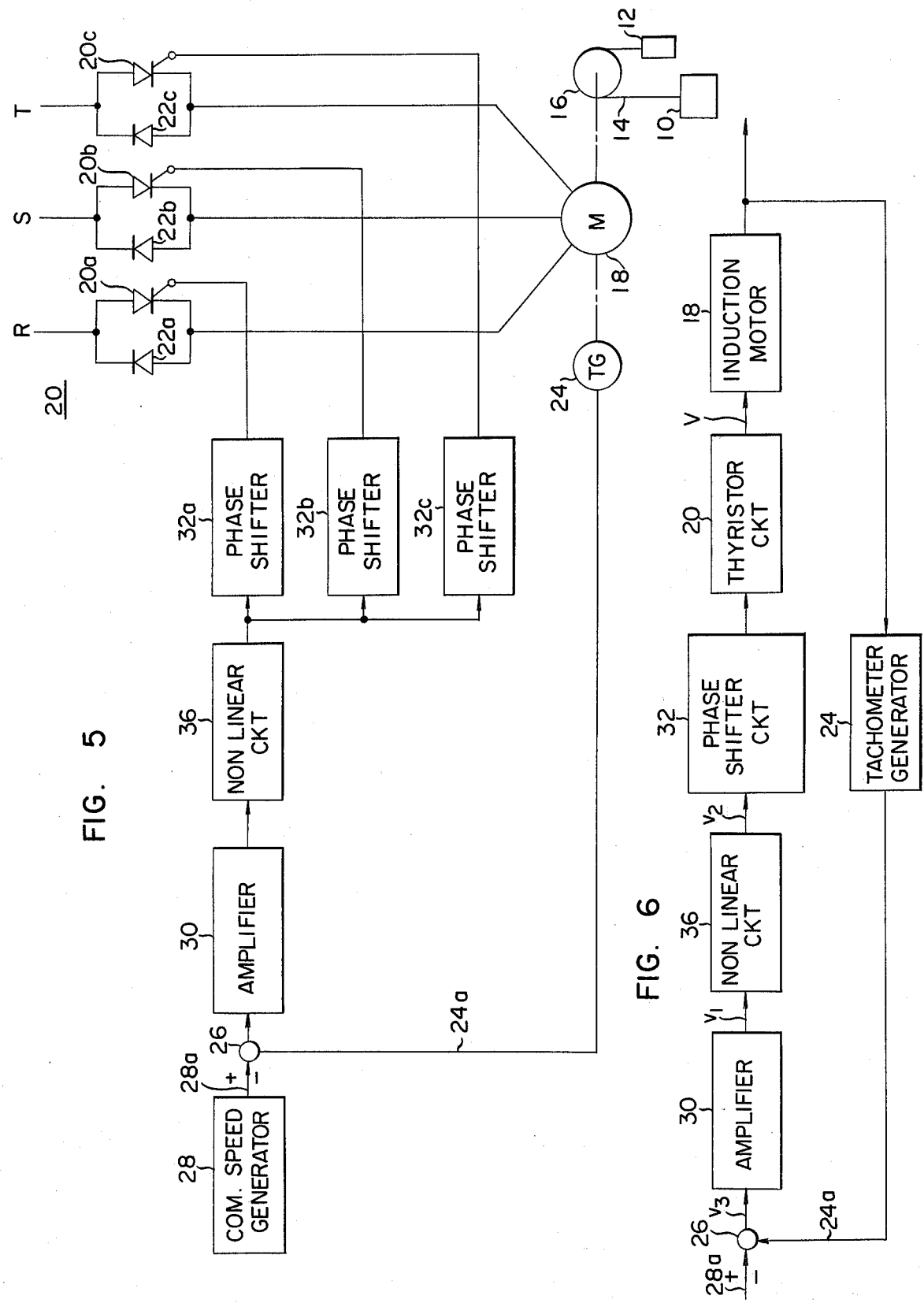
FIG. 5 is a combined block and circuit diagram of an elevator speed control system for an induction motor for driving an elevator car constructed in accordance with the principles of the present invention.
FIG. 6 is a block diagram of the arrangement shown in FIG. 5.

FI. 7 is a wiring diagram of a nonlinear circuit used in the arrangement shown in FIGS. 5 and 6; and FI. 8 is a graph illustrating the input-to-output characteristic of the circuit shown in FIG. 7.

DESCRIPTION OF THE PREFERRED EMBODIMENT

While the present invention is applicable to a variety of induction motors it is particularly suitable for controlling an induction motor for operating elevator systems. Therefore the present invention will now be described in conjunction with an induction motor for operating and elevator system. The arrangement illustrated in FIG. 1 comprises an elevator car 10, and a counterweight 12 connected to the car 10 through a length of cable 14 trained over a sheave 16 connected to a three-phase induction motor 18. The motor 18 is energized by a three-phase electric source designated by the reference characters, R, S and T through thyristors 20a, 20b and 20c having respective semiconductor diodes 22a, 22b and 22c connected in anti-parallel circuit relationship therewith. When energized, the motor 18 rotates the sheave 16 to move the elevator car 10 upwardly or downwardly as the case may be.

The arrangement further comprises a tachometer generator 24 directly connected to the inductor motor 18 to produce a speed signal 24a representing the actual rotational speed of the motor 18 and therefore the actual speed of movement of the elevator car 10. The generator 24 is connected to one input of a subtracter 26 having the other input connected to a command speed generator 28 for producing a command speed signal 28a providing a speed pattern for the rotational speed of the induction motor 18. The out-put of the subtracter 26 is connected to an amplifier 30 subsequently connected to three parallel phase shifters 32a, 32b and 22c The phase shifters 32a, 32b and 32c are respectively connected to the thyristors 20a, 20b and 20c for the purpose of controlling the firing angles thereof respectively.

The subtracter 26 is operated to subtract the actual speed signal 24a or a feed-back signal corresponding to the actual speed of the elevator car 10 from a command speed signal 28a from the command speed generator 28. A difference signal between those two signals is amplified by the amplifier 30 and then applied to the three phase shifters 32a, 32b and 32c. The phase shifters 32a, 32b and 32c respond to the amplified difference signal to produce control signals for the firing angles of the associated thyristors 20a, 20b and 20c respectively thereby to adjust the three-phase voltage applied to the induction motor 18 resulting in the control of the rotational speed of the motor 18. Therefore the speed of movement of the elevator car 10 is controlled through the sheave 16.

Thus it is seen in FIG. 1 that a closed loop speed control system is formed in which the rotational speed of the induction motor 18 is sensed by the tachometer generator 24 and the sensed signal is negatively fed back as the actual speed signal 24a to the subtracter 26 to be compared with the command speed signal 28a from the command speed signal generator 28.

The closed loop speed control system may be illustrated in a block diagram as shown in FIG. 2. In FIG. 2, the command speed signal 28a is applied to the subtracter 26 where it is subject to the subtraction and then applied to the amplifier 30. The output from the amplifier 30 is supplied to a phase shifter circuit 32. The phase shifter circuit 32 is operative to control a firing angles of the thyristors in a thyristor circuit 20 thereby to change the three-phase voltage V applied to the three-phase induction motor 18. The induction motor 18 has a rotational speed $\omega$ which is, in turn, sensed by the tachometer generator 24 and fed back to the subtracter 26.

The relationship between the voltage V applied to the motor 18 and a torque T produced thereby is expressed by $$T = K_3 V^2$$

where $K_3$ is a proportional constant. Differentiating the above equation with respect to the voltage $V$ yields $$dT/dV = 2K_3 V.$$

This describes that the torque produced by the induction motor due to its applied voltage has a gain proportional to the applied voltage. Therefore the speed control system as shown in the block diagram of FIG. 2 has an overall gain which varies in proportion to the input signal thereto. Referring now to FIG. 3 wherein the torque T of the induction motor 18 is plotted on the ordinate against the voltage V applied thereto on the abscissa, the fact that this gain is proportional to the applied voltage means that a voltage of $V_2$ applied to the motor 18 gives a magnitude of the overall gain equal to $V_2/V_1$ times that obtained by a voltage $V_1$ applied to the motor 18. It is now assumed tha with the voltage $V_1$ applied to the motor 18, the speed control system therefor has a total transfer characteristic selected to be a constant most suitable for controlling the particular elevator car, for example, the characteristic as shown by curve 34 in the Bode diagram of FIG. 4 wherein the gain in db is plotted on the ordinate against the frequency 1T on the abscissa. Under the assumed condition an increase of, the voltage applied to the motor to $V_2$ results in the characteristic as shown at curve 36 in the Bode diagram of FIG. 4. That is, the speed control system has an extraordinarily high response. This causes the speed control system to be placed in an extraordinarily unstable state resulting in the tendency of the movement of an associated elevator car to become very vibrational.

On the other hand, assuming that with a voltage $V_2$ applied to the motor, the speed control system has an overall transfer characteristic selected to be a constant most suitable for controlling the elevator car, a voltage $V_1$, below the voltage $V_2$ applied to the motor causes an extraordinarily slow response. As a result, the elevator car 10 tends to overshoot the position where it is to land. Alternatively the car is likely to be adversely affected by various external disturbances.

The present invention seeks to eliminate the disadvantages of the prior art practice as above described by the provision of an elevator speed control system capable of stably controlling an induction motor for driving an elevator with a high accuracy by always maintaining the overall gain thereof constant even during a change in torque produced by the motor in response to a variation in the voltage applied to the motor.

Referring now to FIG. 5 wherein like reference numerals designate components identical to those shown in FIG. 1, there is illustrated a speed control system for an induction motor for driving an elevator car constructed in accordance with the principles of the present invention. The arrangement illustrated is different from that shown in FIG. 1 only in that in FIG. 5, a nonlinear circuit 36 is connected between the amplifier 30 and the three-phase shifters 32a, 32b and 32c.

The arrangement constitutes a closed loop speed control system as shown in the block diagram of FIG. 6. In FIG. 6 the nonlinear circuit 36 is shown as having an input voltage of $V_1$ applied thereto from the amplifier 30 and an output voltage of $V_2$ supplied to the phase shifter circuit 32. In other respects the arrangement is identical to that shown in FIG. 2. The non-linear circuit 36 in this case produces an output voltage $V_2$ $V_2$ approximately proportional to the square root of the input voltage $V_1$ and the details thereof are shown in FIG. 7.

In FIG. 7 the input voltage $V_1$ supplied from the amplifier 30 (not shown in FIG. 7) is applied to a resistor 40 connected to an input to an operational amplifier 42. The operational amplifier 42 has its output connected to its input through a resistance network $R_c$. In the resistance network $R_c$ a pair of resistors 44 and 46 interconnected in parallel are connected to the resistor 40. The resistor 44 is connected to the output of the operational amplifier 42 through a series combination of resistors 48 and 50, while the resistor 46 is connected to the junction of semiconductor diodes 52 and 54 serially interconnected across the serially connected resistors 48 and 50 and also to the junction of semiconductor diodes 56 and 58 serially interconnected across the serially connected diodes 52 and 54. The junction of the diodes 56 and 58 is connected to that of the resistors 48 and 50. Thus the resistor 46 is connected to the output of the operational amplifier 42 through the diodes 54 and 58 and the parallel resistor 50.

It is now assumed that each of the resistors and diodes has a magnitude of resistance expressed by the reference character R suffixed with the reference numeral designating the same. For example, the resistor 40 has a magnitude of resistance of $R_{40}$ and the diode 52 has a magnitude of resistance of $R_{52}$. Then the resistance network $R_c$ has a magnitude of resistance of $R_c$ equal to $$R_c = R_{54}//R_{58}//R_{50}// + (R_{52}//R_{56}//R_{48}// + R_{44})//R_{46}$$

where the symbol 11 designates the magnitude of the resultant resistance provided by those resistors on opposite sides of the symbol connected in parallel to each other. For example, $R_{54}// R_{58}$ designates the resultant magnitude of the resistance $R_{54}$ and $R_{58}$ on opposite sides of the symbol connected in parallel to each other and the resistance $R_{52}$, $R_{56}$ and $R_{48}$ interconnected in parallel has a resultant magnitude of $R_{52}// R_{56}// R_{48}$.

If the output voltage $v_2$ has an absolute magnitude equal to or less than the barrier voltage of each of the diodes 54 and 58 then the diodes 52 through 58 have a high magnitude of resistance and therefore $R_{54}//R_{58}//R_{50}$ and $R_{52}//R_{56}//R_{48}$ become approximately equal to $R_{50}$ and $R_{48}$ respectively. On the other hand, if the output voltage $v_2$ has an absolute magnitude exceeding the barrier voltage of each of the diodes 54 and 58 then $R_{54}$ and $R_{58}$ become substantially null. Thus the condition $R_c = (R_{48} + R_{44})//R_{46}$ is obtained. This means that the nonlinear circuit 36 has its gain reduced by a magnitude resulting from the resistor 50. Also the absolute value of the output voltage $v_2$ exceeding the sum of the barrier voltage of the diodes 52 and 54 and that of the diodes 56 and 58 causes $R_{52}$ and $R_{56}$ to be substantially null. Therefore the condition $R_c = R_{44}//R_{46}$ is held so that the gain of the nonlinear circuit 36 is further reduced by a magnitude resulting from the resistor 48.

FIG. 8 is a graph illustrating the input-to-output characteristic of the nonlinear circuit 36 as shown in FIG. 7. In FIG. 8 the output voltage $v_2$ is plotted on the ordinate against the input voltage $v_1$ on the abscissa and $v_{21}$ designates the barrier voltage of the diode 54, $v_{22}$ the sum of the barrier voltage of the diode 52 and that of the diode 54, $v_{23}$ the barrier voltage of the diode 58 and $v_{24}$ designates the sum of the barrier voltage of the diode 56 and that of the diode 58. As shown in FIG. 8, the characteristic curve is formed of broken lines connected at those points having the ordinates of $v_{24}$, $v_{23}$, $v_{21}$ and $v_{22}$ respectively to depict that the output voltage $v_2$ is approximately proportional to the square root of the input voltage $v_1$. That is, the relationship $v_2 = K\sqrt{v_1}$ is obtained where K is a proportional constant.

Referring back to FIG. 6, the difference signal $v_3$ between the command and actual speed signals 28a and 24a respectively is amplified by the amplifier 30 and then supplied to the nonlinear circuit 36 as the input voltage $v_1$. The nonlinear circuit 36 produces an output voltage $v_2$ approximately proportional to the square root of the input voltage $v_1$ as above described in conjunction with FIGS. 7 and 8 and the phase shifters 32a, 32b and 32c respond to this output voltage $v_2$ to control the conduction of the thyristors 20a, 20b and 20c respectively resulting in the control of the induction motor 18 and therefore the elevator car 10.

In the arrangement of FIG. 2, a gain k between the difference signal $v_3$ and the torque T of the motor 18 is expressed by $$k = (T/v_3) = (K_{30} \cdot K_{32} \cdot K_{20})^2 K_3 v_3$$

where $K_{30}$, $K_{32}$ and $K_{20}$ designate the degrees of amplification of the amplifier 30, the phase shifters 32a, 32b and 32c and the thyristor circuit 20 respectively and $K_{30}$ has been previously defined. Thus the conventional control system such as shown in FIGS. 1 and 2 has the overall gain varied in accordance with the difference signal $v_3$.

In the arrangement of FIG. 6, however the gain k between the difference signal $v_3$ and the motor torque T is expressed by $$K = (T/v_3) = K_{30}(K \cdot K_{32} \cdot K_{20})^2 K_3.$$

Therefore the speed control system of the present invention has its overall gain remaining unchanged regardless of the magnitude of the difference signal $v_3$ and therefore can always maintain stable control of an associated induction motor and therefore of an elevator car driven by the motor while the response thereof is prevented from becoming extraordinarily rapid or slow.

Thus it is seen that the present invention provides a closed loop control system for controlling the speed of an elevator induction motor, including a nonlinear circuit operative to vary the output voltage to approximately the square of the input voltage applied thereto to maintain the gain of the control system constant regardless of any change in voltage applied to the motor. This ensures that the control system can always effect stable control of the induction motor with a simple inexpensive construction and without vibration occurring or without the response thereof becoming extraordinarily slow.

While the present invention has been illustrated and described in conjunction with a single preferred embodiment thereof it is to be understood that numerous changes and modifications may be resorted to without departing from the spirit and scope of the present invention. For example, the nonlinear circuit 36 may be disposed either between the subtracter 26 and the amplifier 30 or between the tachometer generator 24 and the subtracter 26. Alternatively the nonlinear circuit 36 may be disposed between each of the phase shifter 32a, 32b or 32c and the associated thyristor 20a, 20b or 20c. In other words, the nonlinear circuit 36 is required only to be disposed in any desired position in the closed loop control system. Further the nonlinear circuit 36 may be of any desired circuit configuration other than that illustrated in FIG. 7 as long as it produces an output voltage approximately proportional to the square root of the input voltage applied thereto.

What is claimed is:

1. An elevator speed control system for controlling the rotational speed of an induction motor for driving an elevator car, comprising an induction motor, a thyristor means for controlling the voltage applied to said induction motor, a command speed signal generator for generating a command speed signal for the rotational speed of said induction motor, a tachometer generator coupled to said induction motor to generate a speed signal representing the actual rotational speed of said induction motor, a subtacter coupled to both said command speed signal generator and said tachometer generator to produce a difference signal between the output signals from both said generators, phase shifter means coupled between said subtracter and said thyristor means and responsive to said difference signal from said subtracter to produce firing signals for said thyristor means, said induction motor, said tachometer generator, said substracter, said phase shifter means and said thyristor means being coupled in a closed loop circuit, and a nonlinear circuit connected in said closed loop circuit for producing an output voltage approximately proportional to the square root of the input voltage applied thereto and offsetting the nonlinear characteristic of the induction motor, whereby the loop gain of said closed loop circuit is maintained constant regardless of the input thereto.

2. An elevator speed control system as claimed in claim 1 wherein said nonlinear circuit is connected between said subtracter and said phase shifter means.

3. An elevator speed control system as claimed in claim 1 wherein said nonlinear circuit is connected between said phase shifter means and said thyristor means.

4. An elevator control system as claimed in claim 1 wherein said nonlinear circuit is connected between said tachometer generator and said subtracter.

5. An elevator speed control system as claimed in claim 1 wherein said nonlinear circuit is comprised of an operational amplifier, a resistor connected to an input to said operational amplifier and a resistance network connected between the input and output of said operational amplifier, said resistance network including a plurality of resistors and a plurality of semiconductor diodes whereby said nonlinear circuit has the desired relationship between the input and output voltages approximated by a series of broken lines.

* * * * *